April 1, 1958     H. B. ELLIS     2,828,770
PRESSURE ABSORBING DEVICE
Filed April 12, 1956

INVENTOR.
HERBERT B. ELLIS
BY
ATTORNEY.

United States Patent Office 2,828,770
Patented Apr. 1, 1958

2,828,770

PRESSURE ABSORBING DEVICE

Herbert B. Ellis, Pasadena, Calif., assignor to Aerojet-General Corporation, Azusa, Calif., a corporation of Ohio Application April 12, 1956, Serial No. 577,694

4 Claims. (Cl. 138—30)

This invention relates to devices for absorbing undesirable pressure variations in fluids, such as water hammer, and has for an object to provide an effective means for reducing the intensity of such pressure variations.

In many fluid feeding systems, such as liquid propellant feeding systems for rocket motors, it has been found that the fluid flow rate through conduit is varied by pressure waves in the fluid feeding system. In such systems as rocket motors, such variation is very undesirable as it affects the operation of the motor.

In accordance with the present invention, there is provided a pressure variation absorbing device associated with the fluid conduit.

A feature resides in the provision of a housing for receiving pressure from the fluid conduit and a resilient member within the housing which is subjected to the undesirable pressure variations or water hammer.

A related feature resides in the provision of material having a low coefficient of elasticity as the resilient member to absorb the energy from pressure variations by hysteresis.

A preferred feature resides in the provision of means for balancing the normal fluid pressure by compressible fluid or gas pressure within the housing to avoid deformation of the resilient member and bellows in the absence of pressure variations.

Figure 1:
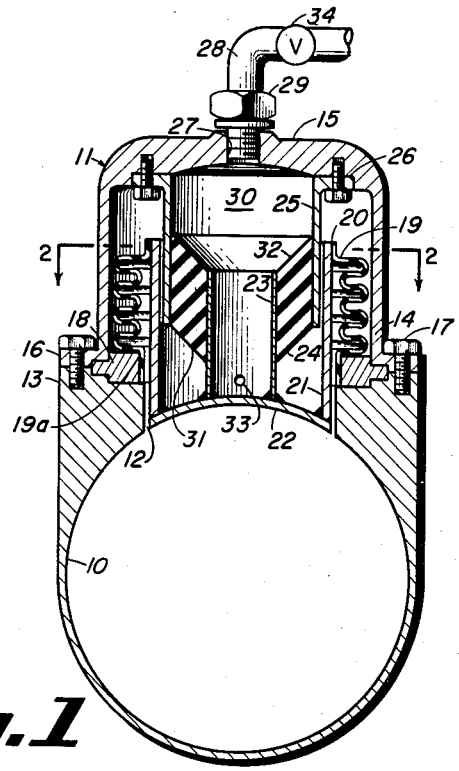
Figure 2:
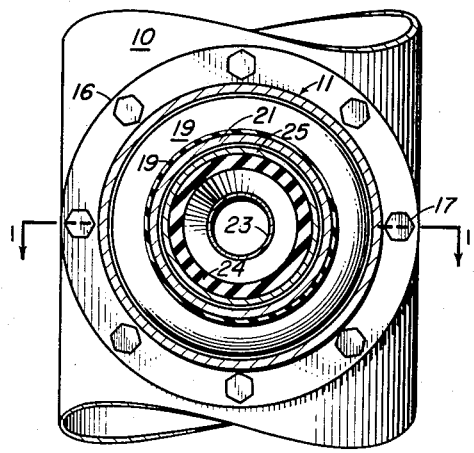

The foregoing and other features will be better understood from the following detailed description and the accompanying drawing, of which:

Fig. 1 is a cross-section view taken at line 1—1 of Fig. 2, of a device in accordance with this invention; and Fig. 2 is a cross-section view taken at line 2—2 of Fig. 1.

Referring to the drawing, there is shown a conduit or pipe 10 carrying a liquid subject to water hammer which it is desired to absorb. In accordance with this invention, mechanism 11 for absorbing the water hammer is provided. This involves an approximately circular opening 12 in the side of the pipe 10, the rim of which is provided with a boss 13 on which is mounted a housing 14 in the form of a hollow cylinder closed at its upper end 15 and provided with a lower flange 16 for fastening to the boss 13 by bolts 17. Between the flange 16 and the boss 13 there is clamped a clamping ring 18 to which the lower end of a bellows 19 is bonded in a pressure-tight seal at 19a. The upper rim of the bellows is bonded at 20 to the upper rim of a sleeve 21, the lower rim of which is closed by a disk 22 which may be welded to the sleeve.

There is concentrically located within the sleeve 21, a tube 23 which is also fastened at its lower end to the disk 22. An annulus or cylinder 24 of resilient material having a low coefficient of elasticity such as rubber is bonded to the outside of tube 23 and also to the inner wall of a cylindrical member 25 supported from a ring 26 within the top 15 of the housing. The cylinder 25 is of somewhat smaller diameter than that of the sleeve 21, leaving a clearance therebetween. The resilient member 24 is preferably provided with end surfaces 31 and 32 which are substantially parallel to each other and in the form of conical frustums. The tubing 23 is provided with a hole 33 for allowing equalizing of pressure on both sides thereof.

The resilient member is preferably rubber, however, any flexible material having a low coefficient of elasticity can be used in place of rubber. Such materials are capable of absorbing and dissipating energy through hysteresis.

It is preferred to employ the resilient member in form such that the forces exerted upon the disk produce shear deformation of the resilient member. For example, shear deformation is obtained whenever forces are applied in opposite directions on generally parallel sides of a resilient material. The horizontal cross-section configuration can be, for example, rectangular, triangular, or annular as shown. A plurality of such resilient members can be used in the practice of my invention if desired.

At the top of the housing there is an opening 27 to which is fitted a tubing 28 by a coupling 29 so that fluid such as gas may be introduced into the chamber 30 within the housing. A valve 34 controls the fluid inlet.

The chamber 30 is separated from the conduit 10 by pressure-tight bellows 19. The pressure simply acts against the bottom of disk 22 and within the sleeve 21. With valve 34 shut off, the operation is as follows: The pressure of the fluid in conduit 10 operates against the bottom of disk 22, tending to force it upwardly, thus forcing the members 21 and 23 upwardly. This extends the bellows and produces a shear deformation of the resilient material 24, thereby distorting the material 24 and correspondingly changing the conical angles of the frusto-conical surfaces 31 and 32. Thus, variations in pressure within conduit 10 produce corresponding movements upwardly or downwardly of the disk 22 against the resilience of the resilient material 24. This tends to absorb the water hammer effect.

In a preferred embodiment of my invention, to avoid distortion of the rubber ring of resilient material 24 during times of normal pressure in conduit 10, while still utilizing its energy absorption characteristics during periods of pressure variations in conduit 10, the pressure in chamber 30 of the housing may be increased to equal that of the normal pressure in conduit 10. This is done by opening valve 34 and admitting a gas such as air under pressure through tube 28 into the chamber 30. Hole 33 produces equalization of the pressure throughout all regions within the housing; thus there is no distortion of the rubber ring or the bellows during normal flow of fluid in conduit 10, but only during fluctuations of pressure in conduit 10.

While the foregoing description has been concerned with the details of specific examples of my invention, it will be understood that changes in the construction and operation of the various parts may be made without departing either from the spirit of the invention or the scope of the claims.

I claim:

1. A fluid hammer absorber comprising a fluid-tight housing adapted to be connected with a fluid container subject to fluid hammer, a movable member having a surface exposed to the pressure of the fluid, flexible sealing means attaching said movable member to the housing thereby isolating said housing from fluid carried by said container, a supporting tube attached to the movable member within the housing, a supporting means attached to the housing, and a resilient material attached to said supporting means and to said supporting tube, said housing, resilient material, and movable members defining a chamber for receiving fluid under pressure to counteract the effect on said resilient material of a normal non-hammering pressure in the container, whereby changes in the fluid pressure in the container produce corresponding movement of the movable surface against the resilience of the flexible sealing means and the resilient material.

2. A fluid hammer absorber comprising a fluid-tight housing adapted to be connected with a fluid container subject to fluid hammer, a movable disk exposed to the pressure of the fluid, a bellows attaching said movable disk to the housing thereby isolating said housing from fluid carried by said container, a tubular supporting member attached to the movable disk within the housing, a supporting cylinder attached to the housing, and a resilient rubbery material bonded to both said tubular support and said cylinder, said housing, resilient material, tubular member and disk defining chamber for receiving fluid under pressure to counteract the effect on said resilient material of a normal, non-hammering pressure in the container, whereby changes in the fluid pressure in the container produce corresponding movements of the movable disk against the resilience of the rubbery material and the bellows.

3. Apparatus according to claim 2 in which said tubular member contains an aperture through its wall at a location between said disk and said resilient material to equalize the pressures on both sides of the tubular member.

4. Apparatus according to claim 2 in which said housing includes means for introducing a fluid balancing pressure into the housing to balance the pressure of the fluid in the fluid container.

References Cited in the file of this patent
UNITED STATES PATENTS

| | | |
|---|---|---|
| 1,875,732 | Holttum | Sept. 6, 1932 |
| 2,411,315 | Ashton | Nov. 19, 1946 |
| 2,457,749 | Thiry | Dec. 28, 1948 |